United States Patent [19]
Reinhart et al.

[11] Patent Number: 5,667,116
[45] Date of Patent: Sep. 16, 1997

[54] VEHICLE ROOFTOP STORAGE UNIT

[76] Inventors: Bambi L. Reinhart; Robert A. Reinhart, both of 1306 Mt. Laurel Ave., Temple, Pa. 19560

[21] Appl. No.: 617,188

[22] Filed: Mar. 18, 1996

[51] Int. Cl.$^6$ ................................................ B60R 9/055
[52] U.S. Cl. ........................... 224/319; 224/315; 224/328
[58] Field of Search .................................... 224/315, 319, 224/328, 326, 325, 281

[56] References Cited

U.S. PATENT DOCUMENTS

| | | | |
|---|---|---|---|
| D. 269,667 | 7/1983 | Taylor . | |
| 3,209,971 | 10/1965 | Goodell | 224/319 |
| 3,366,295 | 1/1968 | Nygaard | 224/319 |
| 4,261,496 | 4/1981 | Mareydt . | |
| 4,274,569 | 6/1981 | Winter | 224/319 |
| 4,974,766 | 12/1990 | Dipalma . | |
| 4,997,118 | 3/1991 | Uebach . | |
| 5,037,153 | 8/1991 | Stark | 224/281 X |
| 5,096,107 | 3/1992 | Vanson . | |
| 5,372,289 | 12/1994 | Dachicourt | 224/319 X |
| 5,377,890 | 1/1995 | Brunner et al. | 224/315 X |

FOREIGN PATENT DOCUMENTS

| | | |
|---|---|---|
| 2487273 | 1/1982 | France . |
| 2145680 | 4/1985 | United Kingdom . |

*Primary Examiner*—Renee S. Luebke
*Attorney, Agent, or Firm*—Richard C. Litman

[57] ABSTRACT

A vehicle rooftop storage unit includes a rack portion which is permanently installed to the roof of the passenger vehicle at manufacture, or which may be installed as an aftermarket article after vehicle manufacture. A separate container portion is removably securable within the rack portion. The rack portion includes a generally rectangular rail, with the front and side members being fixed in position, and the rear member being hinged to the rear end of one of the side members. The rear member may be locked to the opposite side member to close the rail structure, and thereby capture the container portion within the rack rails. The rack portion captures the container portion by a tongue formed along the inner face of the rail, which engages a mating peripheral groove in the container portion; the tongue and groove configuration may be reversed between container and rack rail, if desired. The container may be slid into the rack rails and the rear rail member locked in place therebehind to lock the container to the rack and thus to the vehicle. The container portion has a lockable lid, with the locks of the container lid and rear rack member preferably requiring a key identical to the vehicle door and/or ignition key. The rack and container are preferably color coordinated with the vehicle with which they are originally provided. However, the container portion may be removed and transferred to any other vehicle having an identically configured rack, as desired.

20 Claims, 3 Drawing Sheets

VEHICLE ROOFTOP STORAGE UNIT

BACKGROUND OF THE INVENTION

1. Field of the Invention

The present invention relates to motor vehicles, and more particularly to a storage container adapted for removable placement on the roof of a motor vehicle or the like. A rack for the container is permanently installed upon the top of the vehicle at or after the time of manufacture of the vehicle, with the rack serving to lock and secure the storage unit in place on the vehicle, as desired.

2. Description of the Prior Art

The need for additional portable storage volume during travel has been a problem throughout recorded history, and various devices have been developed to respond to the need, ranging from saddlebags for horses to more recently developed articles better adapted for modern transportation. With the development of the motor or engine driven passenger vehicle, additional storage devices have been developed, some of which were incorporated into the vehicle at the time of manufacture and integrated with the vehicle, and others of which were either strapped or otherwise secured to the vehicle in makeshift fashion, or specifically developed for attachment to the vehicle in some way or another.

Examples of the latter are rooftop ski racks and luggage racks, which necessitate ropes and straps of various sorts to secure luggage thereto. Other enclosed containers have been developed for vehicle rooftop use, but these containers are generally secured only by an aftermarket rack which is removably or permanently installed to the vehicle roof, with the container itself being strapped or otherwise removably secured to the rack.

The above solutions to the problem of additional storage while traveling, generally result in relatively insecure storage of articles tied to a rooftop rack or stored within a rooftop container. Anyone can come along and cut the ropes or straps securing luggage or other articles to a rack, or securing the rack and/or storage container to the vehicle, and abscond with the luggage or articles. Travelers have been forced to respond by using chains and/or steel cables and locks to secure their goods, which on occasion result in damage to the vehicle finish, as well as being cumbersome and time consuming to use and leading to frustration when a padlock or key therefor is lost or a combination is forgotten. However, the only alternative is the removal of the luggage and/or other articles whenever the vehicle is left unattended, which is also a cumbersome and time consuming process.

Accordingly, a need will be seen for a vehicle rooftop storage unit which comprises a permanently mounted rooftop rack and a container which may be locked therein or removed therefrom, as desired. A discussion of the distinctions between the present invention and the prior art is provided immediately following.

U.S. Pat. No. 3,209,971 issued to John L. Goodell on Oct. 5, 1965 describes an Automobile Top Carrier And Cases Therefor, comprising a generally conventional roof rack of predetermined size and a plurality of closable cases adapted to fit closely within the rack. The cases interlock with one another and with the horizontal components of the rails when placed atop the car. However, no means is provided to lock the cases to the rack; anyone may come along and remove one or more of the cases, as no key or other anti-theft locking means is provided. Moreover, if it is desired to access the contents of any case, it must be removed from the roof rack; the cases cannot be opened while secured within the rack. The rack itself is a fixed unit, and has no openable components, as provided for the removal of the storage unit in the present invention.

U.S. Pat. No. 4,261,496 issued to Ray G. Mareydt et al. on Apr. 14, 1981 describes a Ski Rack comprising a pair of spaced apart longitudinal channels or tracks permanently installed to the roof of a car. A pair of transverse arms is adjustably secured to the channels. These arms each have an upper portion which is hinged at one end and lockable at the opposite end, to secure skis or other thin elongate articles therebetween. No enclosed storage container is disclosed by Mareydt et al. The arms are hinged about a horizontal axis to lift vertically, rather than swinging horizontally, as in the openable portion of the present rack invention. The racks are not adapted to capture a container horizontally therebetween, as in the present rack apparatus.

U.S. Pat. No. 4,274,569 issued to Roger D. Winter et al. on Jun. 23, 1981 describes a Luggage Case And Vehicle Rack Therefor, with a tongue on the bottom of the suitcase engaging a horizontal rack member. A rack side member includes a lock which locks another member of the suitcase thereto. The apparatus is adapted only for use with a specially manufactured suitcase, rather than with a rooftop storage unit substantially the same size as the vehicle roof. The rack includes only a single side member, and does not grip the suitcase therebetween, as provided by the present rack configuration.

U.S. Pat. No. 4,974,766 issued to Vince F. DiPalma et al. on Dec. 4, 1990 describes a Vehicle Roof Top Carrier And Method Of Using Same. The carrier includes a rack which is permanently mounted to the roof of the vehicle, and an openable cover which is permanently secured to the rack. The bottom of the enclosure is defined by the roof of the vehicle, and thus the cover portion cannot be removed and transferred to another vehicle, as is provided by the container portion of the present storage unit.

U. S. Pat. No. 4,997,118 issued to Horst Uebach et al. on Mar. 5, 1991 describes a Roof Trunk, or more particularly a specific multiple latch mechanism therefor actuated by a single handle. The mechanism is similar to that used in many pickup truck shell rear gates, with a single tee handle being turned to engage or disengage the plural latches. No rack or attachment means for the trunk is disclosed, and the lid is permanently secured to the base portion by hinges at one end of the trunk.

U.S. Pat. No. 5,096,107 issued to W. Peter VanSon on Mar. 17, 1992 describes a Means For Securing An Enclosure For Luggage On A Cartop Rack, comprising a flexible, waterproof fabric container which is removably attachable to a conventional roof rack. A plurality of openable sleeves is provided, which sleeves are adapted to secure around the existing roof rack rail members. A zipper, snaps, or other similar closure means are used to secure the sleeves, and to secure the top of the container to the remainder thereof. The container is not a rigid shell, as in the present invention, is not lockable, and cannot be slidingly secured to and locked to or removed from the existing rack with its permanently fixed components.

U.S. Pat. No. D-269,667 issued to Don R. Taylor et al. on Jul. 12, 1983 describes a design for an Automobile Roof Top Carrier, comprising a somewhat aerodynamically shaped shell with the upper portion thereof hinged on one side. No means is indicated for the attachment of the shell to a rack or to the roof of the vehicle, nor is any locking means indicated.

French Patent Publication No. 2,487,273 to Jacques Ricouard et al. and published on Jan. 29, 1982 describes an Anti-theft Luggage Rack comprising a platform with peripheral rails about three of the four sides thereof, with the fourth rail side being open. A specially adapted case is captured between opposite side rails, but does not engage the fore or aft end rails, as with the present invention. A horizontally pivoting and lockable retainer is spring loaded to bear against the rear of the container. The retainer does not attach to one end of the rack and secure completely across the rack, as in the present invention. The structure of the pivoting retainer requires that the distal end be free to move downward to position the opposite end upwardly to bear against the container in the rack. Thus, the device is not well adapted for use on a generally flat structure, such as a passenger vehicle roof, as the distal end would be blocked from downward movement by the closely adjacent roof structure of the vehicle. This is not a bar to the intended operating environment of the Ricouard et al. rack and container, as FIGS. 3 and 5 clearly indicate that the device is intended for use on the back of a bicycle, with the curvature of the rear tire providing clearance for the downward movement of the distal end of the pivoting retainer arm.

Finally, British Patent Publication No. 2,145,680 to Kenneth S. Marshall and published on Apr. 3, 1985 describes a Vehicle Roof Locker including a pair of spaced apart lateral rack members permanently installed thereto. The rack members are removably attached to the vehicle, unlike the permanently installed rack of the present invention. The container portion is secured above (rather than between) the rack members. The top of the container is a flexible sheet of material, unlike the rigid shell of the present container.

None of the above inventions and patents, taken either singly or in combination, is seen to describe the instant invention as claimed.

SUMMARY OF THE INVENTION

Accordingly, it is a principal object of the invention to provide an improved vehicle rooftop storage unit which comprises a roof rack which is permanently installed to the vehicle roof, and a container portion which is removably securable to the rack.

It is another object of the invention to provide an improved vehicle rooftop storage unit which roof rack portion is adaptable for installation as a permanent component of the vehicle at the time of manufacture of the vehicle, or which may alternatively be installed as an aftermarket unit after vehicle manufacture.

It is a further object of the invention to provide an improved vehicle rooftop storage unit which rack portion comprises a generally rectangular configuration with fixed forward and side members and an openable and lockable hinged rear member, with each of the members including container portion retaining means therein.

An additional object of the invention is to provide an improved vehicle rooftop storage unit which container portion is removably installable within said rack portion, and which container portion includes retaining means mating with the rack portion.

Still another object of the invention is to provide an improved vehicle rooftop storage unit which container portion includes a top which may be selectively opened and secured while the container is secured within the rack portion.

Yet another object of the invention is to provide an improved vehicle rooftop storage unit which retaining means of the rack and container comprises a mating tongue and groove configuration.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
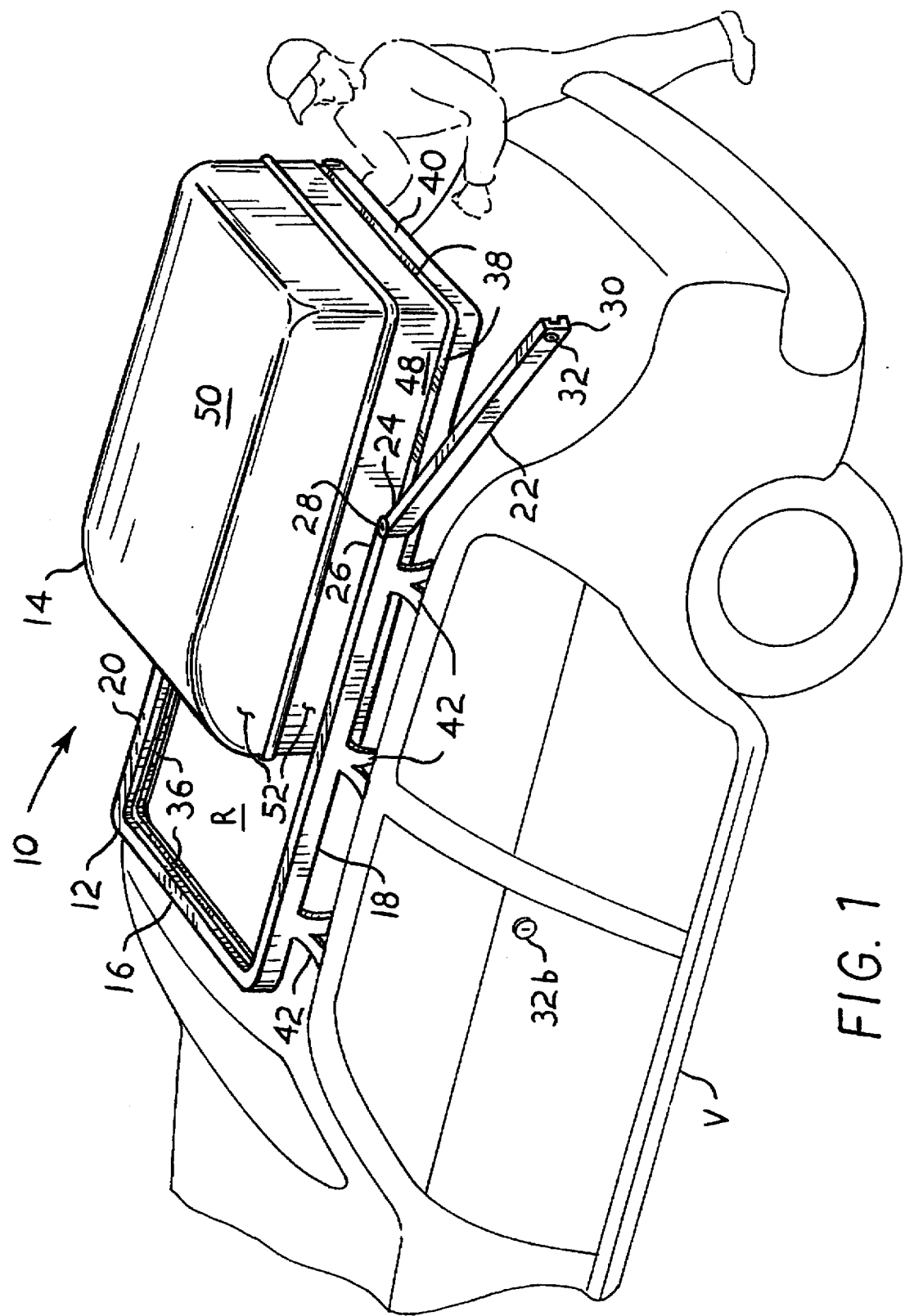
FIG. 1 is an environmental perspective view of the present vehicle rooftop storage unit installed upon the roof of a passenger vehicle, with the rear member of the rack portion opened and the container portion partially removed from the rack portion.

Referring now particularly to FIG. 1 of the drawings, the present invention will be seen to comprise a rooftop storage unit, generally designated with the numeral 10, for a vehicle V having a permanently fixed roof R. The storage unit 10 essentially comprises two major components: A rack 12, which is preferably permanently secured to the vehicle V at the time of manufacture of the vehicle V (or which may alternatively be installed thereto as an aftermarket installation), and a storage container 14 which is removably securable within the rack 12.

The rack 12 is generally in the configuration of a rectangle with an open center (as indicated by the vehicle roof R being visible therethrough in FIG. 1). The rack 12 includes a forward member 16, a first side member 18, an opposite second side member 20 spaced apart from the first side member 18, and a rear member 22. The forward and side members 16/18/20 are each immovably affixed to one another to form three sides of the rectangular rack periphery, but the first end 24 of the rear member 22 is pivotally attached to the rear end 26 of the first side member 18 by a hinge 28 having a vertical axis. Thus, the rear member 22 is free to move arcuately in the plane defined by the rack 12 and to swing away from closure with the second side member 20, unless lockingly secured thereto as described further below. (While the hinged side of the rack 12 is toward the left side of the vehicle V in figure 1, the above described first and second rack sides may be applied to either the left or right side of the vehicle as desired.)

Figure 3:
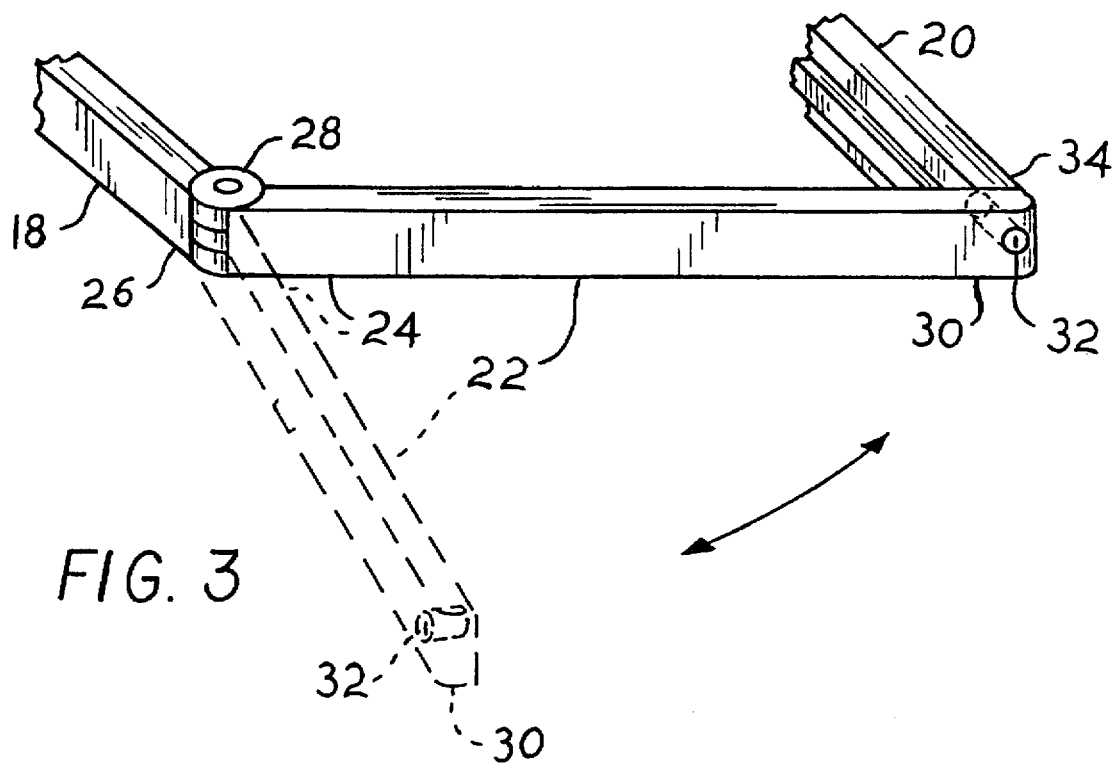
FIG. 3 is a broken away rear perspective view of the rack rail portion of the present invention, showing the hinged attachment of the rear member to the remainder of the rack.

The opposite second end 30 of the rack rear member 22 includes some form of locking means 32 therein, as shown in FIG. 3. The rear end 34 of the rack second side member 20 includes a conventional cooperating latch means therein (not shown). While the locking means 32 shown in the drawing figures is a key actuated lock cylinder, it will be seen that the locking means of the various components described and shown in the present disclosure may comprise combination locks, key actuated locks, remotely activated electronic locks, etc., without departing from the scope of the present invention. By locking the lock means 32 to the latch at the rearward end 34 of the second member 20 of the rack 12, the rectangular periphery defined by the rack 12 may be closed to secure the container unit 14 therein, as described further below.

The rack members 16 through 22 each have an inner surface or periphery which includes some means of capturing the container 14 within the closed rack 12 to preclude its escape or removal. In the rack 12 of FIGS. 1 through 3, this capture means comprises an inwardly protruding tongue 36 which extends continually along the inner surface of each of the rack members 16 through 22. The container 14 is configured to fit closely within the rack 12, and includes a rack engaging groove 38 formed continuously about the lower periphery 40 of the container 14. Thus, the container 14 may be slid into the rack 12 and held therein by the rack tongue 36 engaging the container groove 38, and locked in place by locking the rear rack member 22 to close the rack 12, as shown in FIG. 1.

Figure 2:
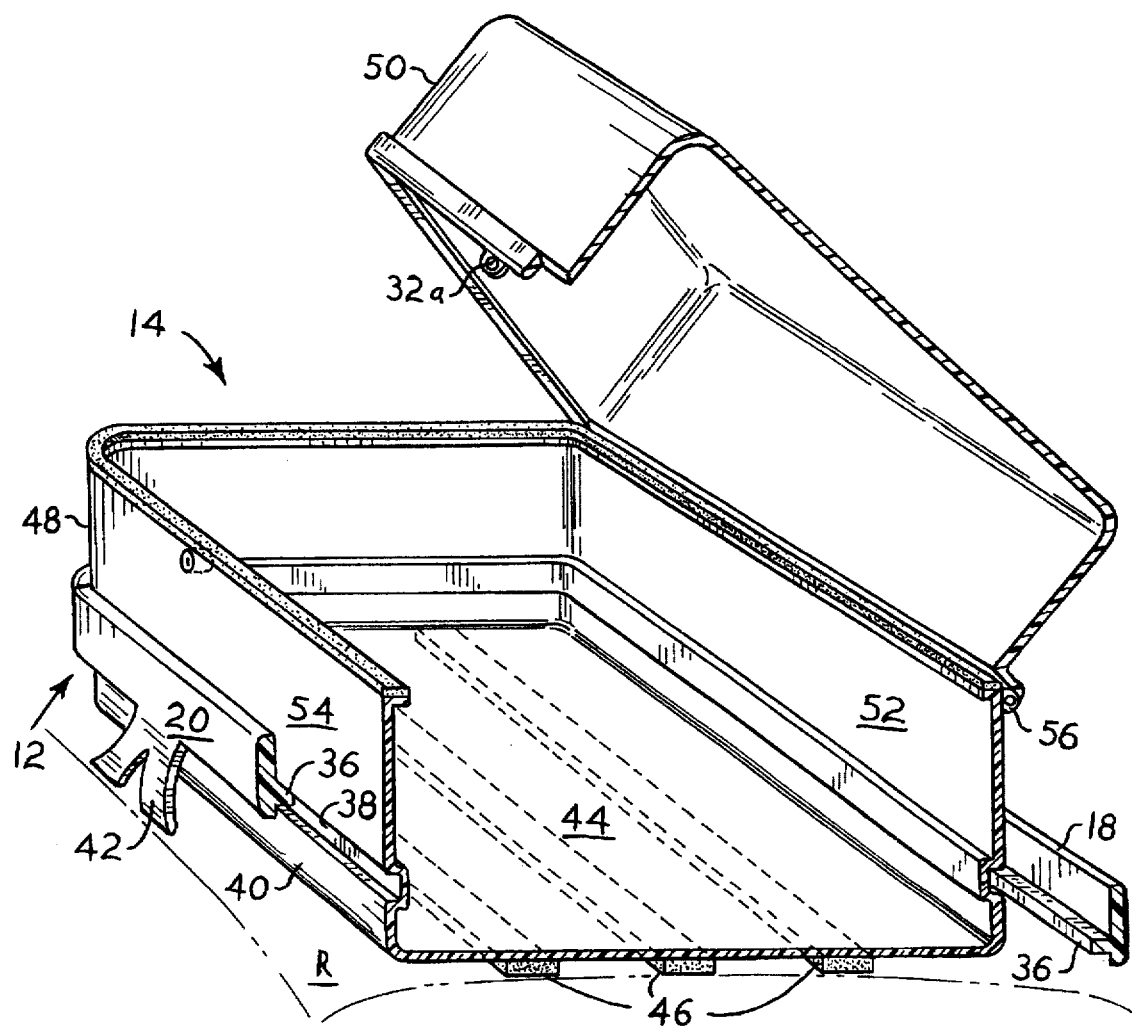
FIG. 2 is a front perspective view in section of the present vehicle rooftop storage unit with the container portion opened, to show various details of the present invention.
Figure 4:
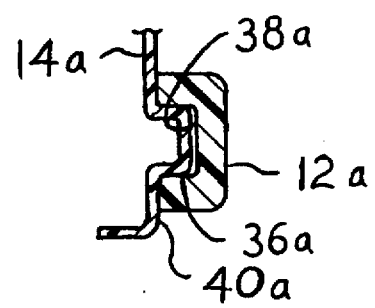
FIG. 4 is an elevation view in section of an alternative storage unit securing means from that shown in FIGS. 1 through 3, wherein the storage container portion includes a peripheral tongue thereabout which cooperates with a longitudinal groove within the rack portion.

While the above configuration is preferred due to the additional strength the additional tongue material provides for the rack members 16 through 22 (and for the interchangeability of a container with racks of different vehicles), it will be seen that the tongue and groove arrangement may be the inverse of that shown in FIGS. 1 through 3. FIG. 4 discloses this alternative, with a rack member 12a shown in cross section having a groove 38a formed therein, and the lower periphery 40a of the container 14a having a protruding tongue 36a formed therearound. Other means of securing the container 14 within the rack 12 may be provided, as desired.

The rack 12 is secured to and supported over the vehicle roof R by a plurality of spaced apart rack supports 42, as shown in FIGS. 1 and 2. These supports 42 may be of any suitable configuration, so long as they provide the required strength to support a loaded container 14 within the rack 12. These supports 42 preferably have sufficient height to place the plane of the rack 12 somewhat above the roof R of the vehicle V, so the floor 44 of the container 14 is spaced at least slightly above the roof R of the vehicle V when the container 14 is secured within the rack 12.

As the container 14 may be formed of a relatively flexible and lightweight material (fiberglass, plastic, etc.), the floor 44 of the container 14 may distend downwardly when luggage and cargo are placed within the container 14. Accordingly, at least one (preferably a plurality) antichafe pad 46 may be provided beneath the floor 44 of the containers 14, to preclude scratching or marring of the roof R of the vehicle V when the container 14 is loaded.

In order to provide optimum convenience for the present vehicle rooftop storage unit invention, the container portion 14 is configured to be openable when the container 14 is secured within the rack portion 12, as shown in FIG. 2 of the drawings. The container 14 comprises a lower base portion 48 and a cooperating lid portion 50 which may be opened for access to the interior of the container 14, or closed and locked as desired. The container 14 includes a first side 52 and an opposite second side 54, corresponding to the first and second rack members 18 and 20 discussed above. (Again, it should be noted that these first and second sides may be applied to either the left or the right side of the vehicle V, as desired.)

The lid portion 50 is secured to the base portion 48 of the container 14 by means of hinges 56 disposed along the first side 52 (only one of which is shown in FIG. 2, but it will be understood that a continuous "piano" type hinge, or a plurality of hinges, may be installed in the conventional manner). The opposite second side 54 of the container 14 includes some form of locking means 32a therein, serving to lockingly secure the lid 50 to the base 48 of the container 14 and secure any contents which may be stored therein. As the hinges 56 and lock 32a are positioned above the container retaining groove 38, the container 14 may be opened or locked closed at any time, even though the container 14 may be locked within the rack 12. (Other configurations may be provided, with the "first side" being defined as the front of the container and the "second side" as the rear, etc.)

The locking means 32 of the rack 12 and the locking means 32a of the container 14 are described using related numerals, as they are preferably keyed identically to one another for convenience. (It should be noted that the term "keyed" used in the present disclosure, while implying the use of tumbler and pin type locks having identical internal arrangements and using identical keys, is also extended to cover combination locks using identical combinations, electronic locks using identical electronic means, etc. The point is that the same locking and unlocking means may be used interchangeably in either of the locks 32 and 32a.)

An extension of the above concept may be provided when the present storage unit 10 is installed to the vehicle V at the time of manufacture, with the lock(s) 32b of the vehicle V also utilizing identical locking and unlocking means as that for the locks 32 and 32a respectively of the rack 12 and container 14. If the present storage unit 10 is added to a vehicle V after its manufacture, then the rack and container locks 32 and 32a may be rekeyed to utilize the same key as required for the vehicle lock(s) 32b. The "valet key" principle may be applied, with the rack and container locks 32/32a being openable only by means of the same key used for the storage areas of the vehicle V (e. g., glove box, trunk, etc.) rather than being openable using a valet key(s) which only operate the vehicle V door and/or ignition, if the vehicle V is so equipped to use a valet key for door and ignition operation and preclude access to other areas of the vehicle with such a valet key.

The present storage unit 10 is well adapted for inclusion and assembly with a passenger vehicle V at the time of vehicle manufacture, as noted further above. Accordingly, either or both the rack portion 12 and/or the container portion 14 may be provided with finishes (paint color, etc.) which match or complement the finish of the vehicle V. The result provides a storage unit 10 which is relatively unobtrusive and blends well with the remainder of the vehicle V, particularly when the container portion 14 is removed from the rack 12. The removability of the container portion 14 provides further utility for the present invention, in that the rack portion 12 may be used for other articles (skis, transport of lumber and/or pipe for home projects, etc.). The rack 12 and the container 14 are preferably formed of sturdy, durable materials, such as high grade plastic and/or fiberglass, but may be stamped or otherwise formed of metals (aluminum, steel, etc.).

The container portion 14 of the present storage unit 10 is preferably slid into the open rack 12 before loading, as indicated generally in FIG. 1 of the drawings. The container 14 is relatively light weight and easily manipulated when empty. The rear member 22 of the rack 12 is then closed behind the container 14 and locked in place, to secure the container 14 immovably within the rack 12. At this point, the lid portion 50 of the container 14 may be opened and luggage, cargo, etc. placed therein, and the lid 50 closed and locked for transport of the articles therein. Any downward distension of the floor 44 of the container 14 is accommodated by the antichafe pad(s) 46 to protect the roof R.

When the destination is reached, (or upon return home after a vacation trip, etc.) the container 14 is opened for removal of the goods contained therein, as desired. When the container 14 has been emptied, its relatively light weight permits its removal from the rack 12 by unlocking the lock 32 to open the rear member 22 of the rack 12, and sliding the container 14 rearward to remove it from the rack 12, for storage away from the vehicle V as desired. The rear member 22 of the rack 12 is then closed and locked to the remainder of the rack 12 to secure the rear member 22 thereto. (Alternatively, the container 14 may be retained in the rack 12.)

In summary, the present vehicle rooftop storage unit will be seen to provide an extremely convenient and efficient means of providing for the extravehicular carriage of articles which do not fit within the vehicle interior. The unit is extremely sturdy, particularly if built into the roof of the vehicle at the time of manufacture, and excellent security is provided for the removable container portion by means of the locking rack. The present unit, with its matching key means for all locks, provides excellent convenience for the owner and user thereof, without need for cumbersome and bothersome additional keys or other means for different locks. The versatility provided by the removable container portion adds a new dimension to the utility of the passenger vehicle so equipped.

It is to be understood that the present invention is not limited to the sole embodiments described above, but encompasses any and all embodiments within the scope of the following claims.

We claim:

1. A rooftop storage unit for a powered passenger vehicle having a fixed roof, said storage unit comprising:

a rack and a container removably securable within said rack;

said rack having a generally rectangular configuration with an open center, with a front peripheral member, a first side peripheral member and an opposite second side peripheral member spaced apart therefrom, and a rear peripheral member defining a generally horizontal plane;

said rack being permanently secured to the roof of the vehicle by a plurality of supports, with said supports each having a height sufficient to place said plane of said rack at least slightly above the roof of the vehicle;

each said side member of said rack having a rearward end and said rear member of said rack having a first and an opposite second end respectively corresponding to said first and said second side member, with said first end of said rear member being hingedly attached to said first side member to swing arcuately in a path coplanar to said plane of said rack;

said second end of said rear member of said rack including locking means therein, and said rearward end of said second side member including cooperating latching means for said locking means of said rear member;

said rack further including an inner periphery having capture means for said container disposed therealong, and;

said container including a base having a lower periphery configured to fit closely within said rack and with rack engaging means disposed therearound, and a selectively openable upper lid, whereby;

said rear member of said rack is unlocked from said second side member and pivotally swung open, said container is secured within said rack by means of said rack engaging means of said container engaging said capture means of said rack, said rear member of said rack is closed and locked to said second member of said rack to capture said container within said rack, and said container is loaded as desired and closed to secure any articles stowed therein.

2. The rooftop storage unit according to claim 1, wherein:

said capture means disposed along said inner periphery of said rack comprises a tongue extending continuously therealong, and said rack engaging means of said container comprises a groove disposed continually therearound and mating closely with said tongue of said rack.

3. The rooftop storage unit according to claim 1, wherein:

said container has a floor, with said floor of said container being spaced apart from the vehicle roof by means of said height of said supports when said container is installed within said rack.

4. The rooftop storage unit according to claim 3, wherein:

said floor includes a lower surface with at least one antichafe pad secured thereto, with said antichafe pad adapted to protect the vehicle roof when said container is loaded and said floor of said container is distended toward the vehicle roof by any load placed therein.

5. The rooftop storage unit according to claim 1, wherein:

said container includes a first side and an opposite second side, with said first side including hinge means therealong securing said lid to said base.

6. The rooftop storage unit according to claim 1, wherein:

said container includes a first side and an opposite second side, with said second side including locking means therein serving to lock said lid to said base when said lid is closed over said base of said container.

7. The rooftop storage unit according to claim 6, wherein:

said locking means of said container is keyed identically to said locking means of said rack.

8. The rooftop storage unit according to claim 1, wherein:

said rack and said container each have a finish identical to one another.

9. The rooftop storage unit according to claim 1, wherein:

said rack and said container are each formed of materials selected from the group consisting of aluminum, steel, plastic, and fiberglass.

10. In combination with a powered passenger vehicle having a fixed roof and locking means, a rooftop storage unit comprising:

a rack and a container removably securable within said rack;

said rack having a generally rectangular configuration with an open center, with a front peripheral member, a first side peripheral member and an opposite second side peripheral member spaced apart therefrom, and a rear peripheral member defining a generally horizontal plane;

said rack being permanently secured to said roof of said vehicle by a plurality of supports, with said supports each having a height sufficient to place said plane of said rack at least slightly above said roof of said vehicle;

each said side member of said rack having a rearward end and said rear member of said rack having a first and an opposite second end respectively corresponding to said first and said second side member, with said first end of said rear member being hingedly attached to said first side member to swing arcuately in a path coplanar to said plane of said rack;

said second end of said rear member of said rack including locking means therein, and said rearward end of said second side member including cooperating latching means for said locking means of said rear member;

said rack further including an inner periphery having capture means for said container disposed therealong, and;

said container including a base having a lower periphery configured to fit closely within said rack and with rack engaging means disposed therearound, and a selectively openable upper lid, whereby;

said rear member of said rack is unlocked from said second side member and pivotally swung open, said container is secured within said rack by means of said rack engaging means of said container engaging said capture means of said rack, said rear member of said rack is closed and locked to said second member of said rack to capture said container within said rack, and said container is loaded as desired and closed to secure any articles stowed therein.

11. The vehicle and rooftop storage unit combination according to claim 10, wherein:

said capture means disposed along said inner periphery of said rack comprises a tongue extending continuously therealong, and said rack engaging means of said container comprises a groove disposed continually therearound and mating closely with said tongue of said rack.

12. The vehicle and rooftop storage unit combination according to claim 10, wherein:

said container has a floor, with said floor of said container being spaced apart from said roof of said vehicle by means of said height of said supports when said container is installed within said rack.

13. The vehicle and rooftop storage unit combination according to claim 12, wherein:

said floor includes a lower surface with at least one antichafe pad secured thereto, with said antichafe pad adapted to protect said roof of said vehicle when said container is loaded and said floor of said container is distended toward said roof of said vehicle by any load placed therein.

14. The vehicle and rooftop storage unit combination according to claim 10, wherein:

said container includes a first side and an opposite second side, with said first side including hinge means therealong securing said lid to said base.

15. The vehicle and rooftop storage unit combination according to claim 10, wherein:

said container includes a first side and an opposite second side, with said second side including locking means therein serving to lock said lid to said base when said lid is closed over said base of said container.

16. The vehicle and rooftop storage unit combination according to claim 15, wherein:

said locking means of said container is keyed identically to said locking means of said rack.

17. The vehicle and rooftop storage unit combination according to claim 15, wherein:

said locking means of said container, said rack, and said vehicle are each keyed identically to one another.

18. The vehicle and rooftop storage unit combination according to claim 10, wherein:

said rack and said container each have a finish identical to one another.

19. The vehicle and rooftop storage unit combination according to claim 10, wherein:

said vehicle, said rack, and said container each have a finish identical to one another.

20. The vehicle and rooftop storage unit combination according to claim 10, wherein:

said rack and said container are each formed of materials selected from the group consisting of aluminum, steel, plastic, and fiberglass.

* * * * *